United States Patent [19]

Nakagawa

[11] Patent Number: 5,606,689
[45] Date of Patent: Feb. 25, 1997

[54] DATA PROCESSING APPARATUS INCLUDING EXTERNAL STORAGE PREVIOUSLY RESERVED TO BE ALLOCATED TO JOB GROUPS

[75] Inventor: Akio Nakagawa, Kawasaki, Japan

[73] Assignee: Fujitsu Limited, Kawasaki, Japan

[21] Appl. No.: 996,176

[22] Filed: Dec. 23, 1992

[30] Foreign Application Priority Data

Dec. 24, 1991 [JP] Japan ................... 3-340565

[51] Int. Cl.⁶ .................................. G06F 17/30
[52] U.S. Cl. ................... 395/622; 395/439; 395/376
[58] Field of Search .................... 395/600, 425, 395/575, 400, 700

[56] References Cited

U.S. PATENT DOCUMENTS

| | | | |
|---|---|---|---|
| 4,769,782 | 9/1988 | Iwanaga | 364/900 |
| 5,018,060 | 5/1991 | Gelb et al. | 364/200 |
| 5,321,835 | 6/1994 | Tanaka et al. | 395/650 |
| 5,333,311 | 7/1994 | Whipple, II | 395/600 |

*Primary Examiner*—Wayne Amsbury
*Assistant Examiner*—Cheryl Lewis
*Attorney, Agent, or Firm*—Staas & Halsey

[57] ABSTRACT

A data processing apparatus and method in which correct storage units can be accurately allocated to jobs of normal operations when the storage volumes are previously reserved for respective normal operations, and storage management can be efficiently performed for each operation. A storage reservation rule storing portion stores storage reservation rules relating to storage groups and job groups, and a storage reservation executing portion selects one of the storage groups corresponding to the name of a normal operation which is input with a file request for a job, and allocates storage units included in the selected storage group.

9 Claims, 20 Drawing Sheets

Fig. 6

```
JOB='ACE**' | DSN='ACE.**' ;
              DSN='*.FAX.**'                                    :' VOLGRP37' ;
              DSN='*.SS*.**' & DSN !='*.SSJO2O.MAST'  :' VOLGRP39' ;
                                                                :' VOLGRP38' ;

GROUP<= 'LAND' & DSNAME<'AHUFNT'   :' VGMSPCA3'  ;
ACCOUNTS='???OO2E' & DSN='???OO2A' :' VGSDK1OO'  ;
                                   :' VOLGRP54'  ;
GRP='C1D1*'                        :' WORKGRP'   ;
```

| DEFINITION ITEM | DEFINITION OF VOLUME GROUP | | | | | |
|---|---|---|---|---|---|---|
| | A | B | C | D | E | F |
| REORGANIZATION CYCLE | YNNNNNN | NYNNNNN | NNYNNYN | NNNYNNN | NNYNNNN | Y |
| START DATE | INDICATE A DATE OF MONDAY | | | | | |
| START TIME | 08:00 | 08:00 | 09:30 | 16:00 | 16:00 | 20:00 |
| WAIT TIME TO RESPONSE | 08:30 | 08:30 | 10:00 | 16:15 | 16:15 | 20:10 |
| END TIME | 10:00 | 10:00 | 11:30 | 17:30 | 17:30 | 21:00 |

UNUSED SPACE

⇓ BY AN OPERATION

UNUSED SPACE

5,606,689

1

DATA PROCESSING APPARATUS INCLUDING EXTERNAL STORAGE PREVIOUSLY RESERVED TO BE ALLOCATED TO JOB GROUPS

BACKGROUND OF THE INVENTION

1. Field of the Invention

The present invention relates to a data processing apparatus, namely, a computer system. Particularly, it relates to a computer system in which storage resources are previously reserved to be allocated to job groups.

2. Description of the Prior Art

A computer system such as a main frame is used by many users. The computer system includes an external storage apparatus. When a user executes a job by opening a file, a part of the external storage apparatus is allocated to the file. The most common external storage apparatus is a magnetic disk system. In this specification, the external storage apparatus such as a magnetic disk apparatus is simply called a "storage". A magnetic disk system is composed of a plurality of magnetic disk units, and these units are generally called "volumes". In the following, this term "volume" is used to express the magnetic disk unit. Generally, when a file is opened, a user can directly indicate a number of the volume in which a storage region is allocated to the file. When the user performs the job under an application program, the volume number of the application program is previously decided, and the application program automatically indicates the volume number. Therefore, the user does not need to indicate the volume number. However, in this case, the application program also indicates the volume number.

When the computer system is individually used by independent users, there is no problem with the above allocation method of storage. However, in organizations such as companies, all business operations are divided into individual operations, for example, sales, production, accounting, and budgets are decided for each operation and all costs are calculated for each operation. Consequently, when a computer system commonly used for the above operations is implemented, the processing ability of the computer, such as arithmetic operation speed, and the total capacity of a storage apparatus is decided according to analysis of present jobs and predicted future jobs of all related operations, and storage volumes are reserved for each operation. Of course, there are storage volumes which are not reserved, and these un-reserved storage volumes are used in common. In the practical operations of a computer system, all costs of operating the computer system are calculated for each individual operation.

In the above, sales, production, and accounting are shown as examples of operations. However, the term "operation" is not limited to above examples. For example, a development project can be an "operation" if particular units of the storage are reserved for this development project for processing data relating to this development project. In this specification, a job group which has an exclusively reserved storage in the computer system is called an "operation".

FIG. 1 is a diagram illustrating operations of the storage volume allocation in the prior art. As shown in FIG. 1, in the computer system of the prior art, a manager 100 of the computer system or a manager of the storage system makes a storage reservation rule table 101 in which corresponding relationships between operations and storage volumes reserved for those operations are indicated, and a print out of the above table are given to each user. When a user 102

2 uses the storage for a particular operation, the user finds the volume numbers of the storage reserved for that operation according to the table 101 and makes a request to the job manager 104 of the computer system 103 to allocate the storage reserved by indicating the volume number. In response to this request, the job manager 104 of the computer system allocates the storage region in the indicated volume of the storage system.

In the table 101 shown in FIG. 1, volumes 10 to 15 are reserved for an operation A, volumes 16 to 22 are reserved for an operation B, volumes 30 to 39 are reserved for an operation C, and so forth. When the user 102 is going to perform a job included the operation A, the user makes a request for file allocation by indicating one of the volumes 10 to 15. This storage allocation request is performed by using a Job Control Language (JCL). If the user makes the request for the storage allocation by indicating, for example, the volume 16, either by mistake or intentionally, the job manager 104 allocates a storage region in the volume 16 to the job in which the user is going to perform the operation A.

As described in above, in the storage management apparatus of the prior art, the manager of the computer system makes the storage reservation rule table, and the user indicates the storage volumes according to this table. Namely, the management of the storage is carried out manually. Therefore, it is not assured that the storage reservation rules given in the table are always observed. As described in above, the storage reservation rules are decided according to practical analysis in order to realize the efficient utilization of the storage. Consequently, when the storage reservation rules are not observed, a problem occures in that the storage is not efficiently utilized. Further, when the volume reservation rules are not observed, a storage volume reserved for a particular operation stores data relating to other operations. Consequently, another problem occures in that fine management of the storage is difficult.

In the computer system, storage information, such as information relating to practical utilization of space and changes therein, is collected, and this information is analyzed to improve the efficiency of the storage. When the analysis is performed in the computer system of the prior art, the information is collected for each storage volume of the storage apparatus, and a person, for example, a manager of the computer system, checks the correspondence between the volumes and the operations according to the storage reservation rule table and classifies the volumes for each operation. Then, the states of the storage volumes reserved for each operation are analyzed. Namely, the collection and classification of the storage information is carried out manually. Therefore, when the analysis of the storage of each operation is performed, problems occure in that the analysis is very complicated because the classification of the storage information is required. Further, when the storage reservation rules are not observed, the classification of the storage information becomes more complicated because storage information corresponding to two or more kinds of operations are stored in one volume of the storage.

As described in above, in the computer system of the prior art, only analysis of the total storage is possible, and fine analysis of each storage is very difficult.

In the computer system, back-up procedures of the storage are performed in order to prepare for the occurrence of failures, and recovery procedures of the storage are performed when failures occur. In the computer system of the prior art, when the above back-up and recovery procedures are performed for storage volumes reserved for each operation, the recovery requires indication of the storage volumes reserved for each operation according to the storage reservation information. Namely, the above procedures for each operation cannot be performed only by indicating the name of the operation. Therefore, the back-up and recovery procedures become complicated.

In the computer system, the arrangement of used and unused space of the storage is occasionally performed. In the computer system of the prior art, when the storage space arrangement procedures are performed for storage volumes reserved for each operation, the space utilization states of the storage volumes reserved for each operation are first examined, and then someone personally makes the arrangement indication to all storage volumes reserved to that operation according to the space utilization states. Therefore, the arrangement of the storage space utilization becomes complicated. Further, the storage utilization methods of respective operations are usually different, therefore, the storage space arrangement is desirably different for each operations. However, when the storage reservation rules are not observed, the individual storage space arrangement corresponding to each operation cannot be efficiently performed because storage volumes reserved for a certain operation contain data of different operations.

SUMMARY OF THE INVENTION

The object of the present invention is to realize a data processing apparatus in which correct storage units can be certainly allocated to jobs of an operation when the storage volumes are previously reserved for respective operations and storage management can be efficiently performed for each operation.

A data processing apparatus according to a first aspect of the present invention includes an external storage apparatus composed of a plurality of storage units which are previously classified into a plurality of storage unit groups and each of the storage unit groups is previously reserved for job groups corresponding to normal operations; a storage reservation rule storing portion which stores a storage reservation rules; and a storage reservation executing portion which selects one of the storage groups corresponding to a name of a normal operation which is input with a file request of the job, and allocates one or more storage units included in the selected storage group.

In the data processing apparatus of the present invention, the storage reservation rules are stored within the apparatus, and the storage unit selection is automatically performed in response to the name of a normal operation input by a user. Therefore, the correct storage units included to the storage group corresponding to the operation are surely allocated, and errors in storage unit allocation are reduced. In this way, efficient storage utilization in accordance with a storage utilization plan corresponding to normal operations is realized.

In addition to the above first aspect, a data processing apparatus according to a second aspect of the present invention further includes a storage information processing means for generating information relating to a change of a storage capacity or a utilized storage capacity of each storage group from the storage reservation rules and the storage allocation information of the storage allocation means.

In the data processing apparatus of the second aspect of the present invention, the storage information classified by operations can be obtained. Therefore, the classification of the storage information for each operation is not required. In this way, the storage information can be efficiently used to determine a utilization state of the storage and to make a utilization plan for the storage.

In addition to the above first aspect, a data processing apparatus according to a third aspect of the present invention further includes a storage operation means for performing internal arrangement procedures relating to back-up, recovery or internal arrangement of each storage group according to the storage reservation rules in response to external operation requirements.

In the data processing apparatus of the third aspect of the present invention, since the relationships between the operations and the storage units are registered, the storage procedures can be performed by indicating the related operation. Therefore, when the storage procedures are performed, the storage units reserved for the operation are not required to be indicated.

In addition to the above first aspects, a data processing apparatus according to a fourth aspect of the present invention in which the storage reservation rule storing means stores space management attribute information of each storage group, and the apparatus further comprises a storage space management means for periodically performing space arrangement in each storage group according to the storage reservation rules and the space management attribute information of each storage group.

In the data processing apparatus of the fourth aspect of the present invention, the space management attribute information is added to the storage information. Therefore, the storage space management can be performed automatically according to the space management attribute information, and the storage space management becomes more efficient. Namely, in the computer of the prior art, the storage space management is generally performed for the total system. However, in the computer of the present invention, the space management can be performed with the storage units reserved for each operation according to the characteristics of each operation. In this way, the storage space management becomes more efficient.

BRIEF DESCRIPTION OF THE DRAWINGS

The present invention will be more clearly understood from the description as set forth below with reference to the accompanying drawings, wherein:

FIG. 6 is a diagram showing an example of the storage reservation rule source program.

FIG. 18 is a diagram showing an example of a definition of a volume reorganization;

DETAILED DESCRIPTION OF THE PREFERRED EMBODIMENTS

Figure 1:
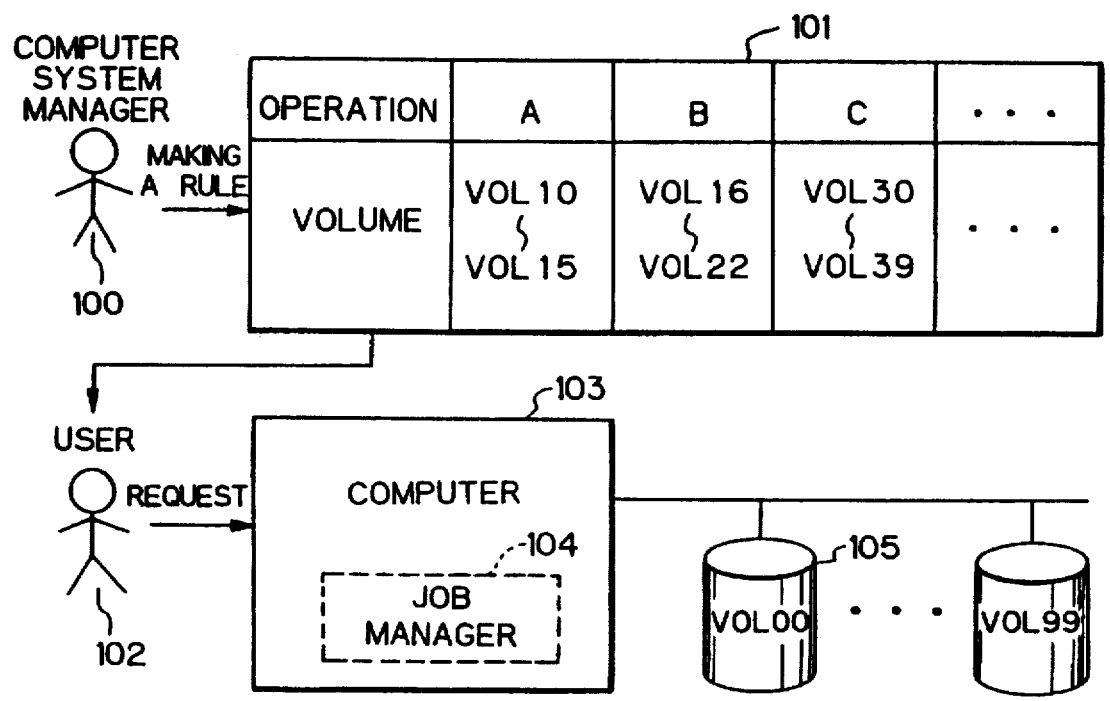
FIG. 1 is a diagram illustrating storage volume allocation in the prior art.
Figure 2A:
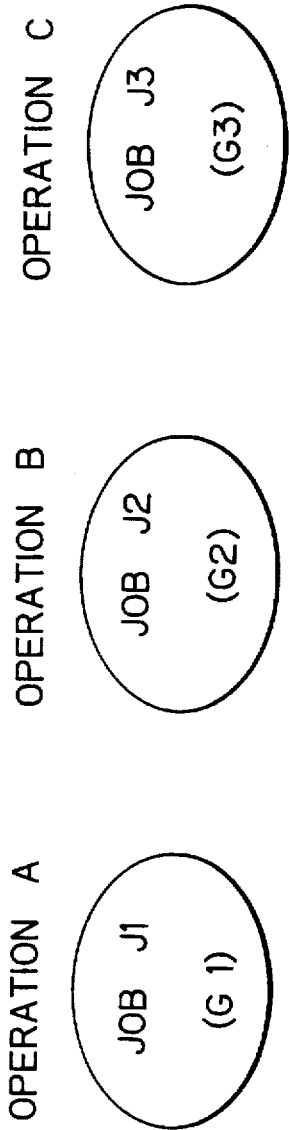
FIGS. 2A and 2B are diagrams showing the categorization of normal operations.
Figure 2B:
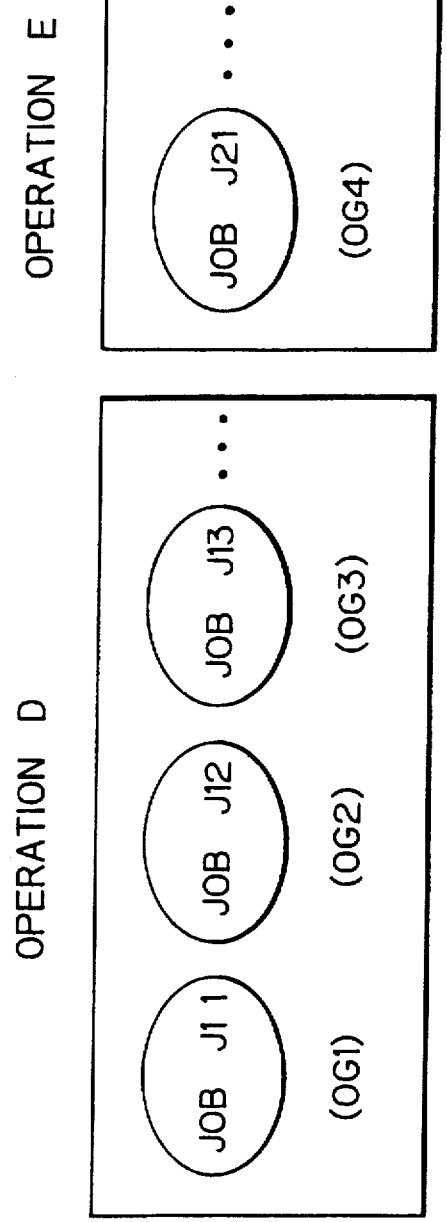

FIGS. 2A and 2B are diagrams showing the categorization of normal operations in the present invention. FIG. 2A shows restricted operations. A job J1 of a group G1, a job J2 of a group G2, a job J3 of a group G3 respectively correspond to operations A, B, C. FIG. 2B shows broad operations. A job J11 of an organization OG1, a job J12 of an organization OG2 and a job J13 of an organization OG3, etc., correspond to an operation D. A job J21 of an organization OG4, etc., correspond to an operation E.

By classifying by organizations, business operations having the same contents can be classified into two operational categories. For example, sales operations to a particular customer correspond to the restricted operations of narrow sense, and total sales correspond to the broad operation. Consequently, when the storage management of the computer system is carried out according to operations, it is desirable that the operations are defined as units which can be managed by organizations.

Figure 3:
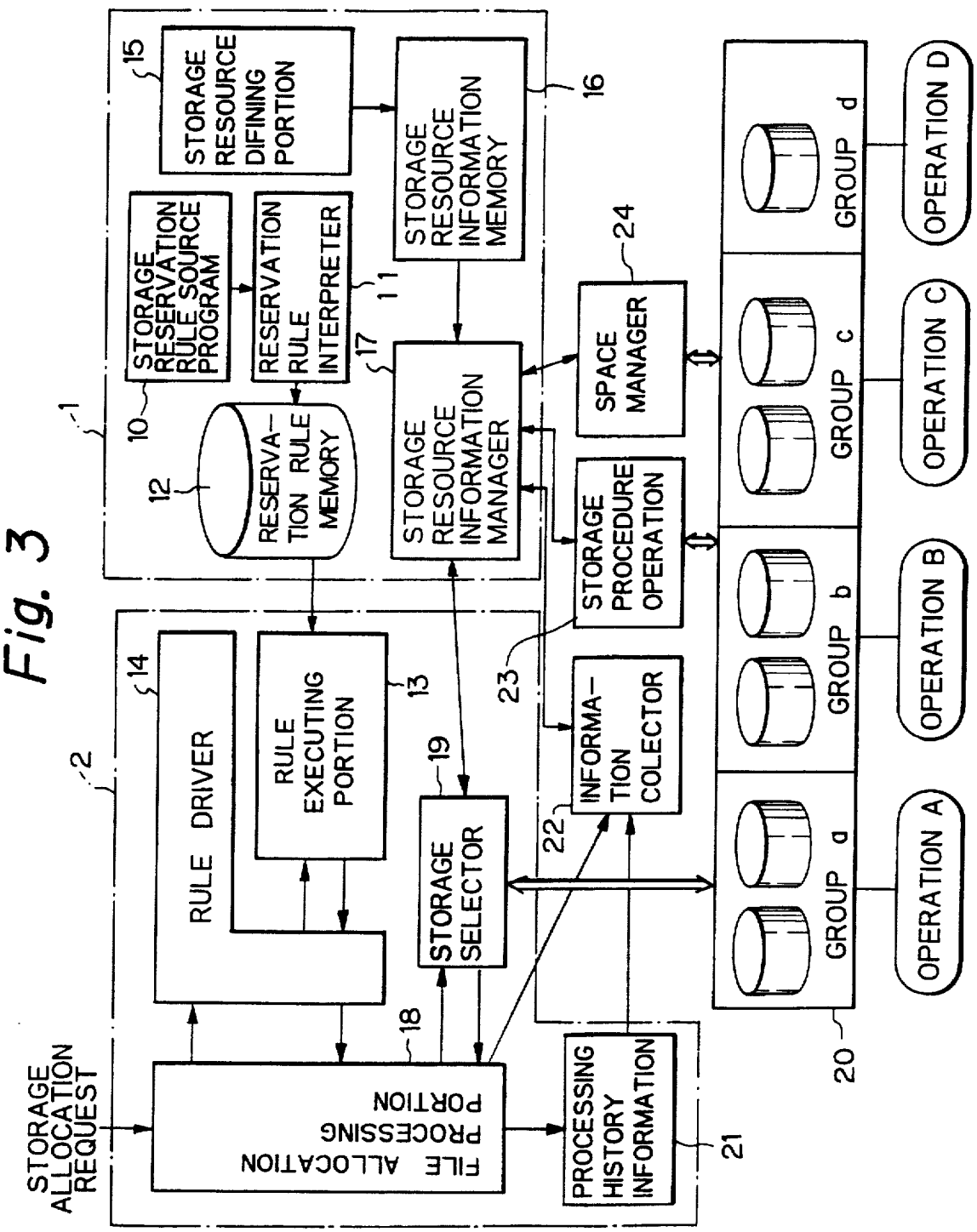
FIG. 3 is a block diagram of a storage management portion of a computer system of an embodiment according to the present invention.

FIG. 3 is a block diagram of a storage management portion of a computer system of an embodiment according to the present invention.

In FIG. 3, reference numeral 10 designates a storage reservation rule source program for expressing a storage reservation rule in a high-level language, reference numeral 11 designates an reservation rule interpreter which converts the storage reservation rule into machine language, reference numeral 12 designates a reservation rule memory which stores the storage reservation rule expressed in machine language, reference numeral 13 designates a rule executing portion which executes the storage reservation rule, reference numeral 14 designates a rule driver which activates the executing portion 13, reference numeral 15 designates a storage resource defining portion which defines management information of the storage resource such as magnetic disk volumes, reference numeral 16 designates a storage resource information memory which stores the management information of the storage resource, reference numeral 17 designates a storage resource information manager which manages the storage resource information, reference numeral 18 designates a file allocation processing portion which performs a storage allocation for a file, reference numeral 19 designates a storage selector which selects a practical storage apparatus allocated to the file, reference numeral 20 designates a storage which is an external storage resource of the computer, reference numeral 21 designates processing history information of the file allocation processing portion 18, reference numeral 22 designates an information collector which collects the storage information, reference numeral 23 designates a storage procedure operator for performing various operations on the storage 20 and reference numeral 24 designates a space manager which performs a space management of the storage 20.

In the constitution of FIG. 3, the storage reservation rule source program 10, the reservation rule interpreter 11, the reservation rule memory 12, the storage resource defining portion 15, the storage resource information memory 16 and the storage resource information manager 17 constitute a storage reservation rule storing portion 1, and the rule executing portion 13, the rule driver 14, the file allocation processing portion 18, and the storage selector 19 constitute a storage allocation portion 2. A data processing apparatus according to the first aspect includes the storage reservation rule storing portion 1 and the storage allocation portion 2. The information collector 22, the storage operator 23 and the space manager 24 can be individually attached to the above first aspect, and constitutions respectively attached to the information collector 22, the storage operator 23 and the space manager 24 respectively correspond to the second, third and fourth aspects. As shown in FIG. 3, in the embodiment, all of above-mentioned three portions are together to the constitution of the first aspect.

In the embodiment, a high-level language of the computer system is provided for describing the storage reservation rules which are made for every operation, and the reservation rule source program 10 is made by using this high-level language. The reservation rule source program 10 is stored in the computer system. The reservation rule interpreter 11 generates the storage reservation rule by compiling the reservation rule source program 10. The compiled source program is expressed in a form which the computer can directly execute, and the generated storage reservation rule is stored in the reservation rule memory 12.

For example, the storage 20 is a magnetic disk system which is composed of storage volumes. The storage volumes are previously classified into groups corresponding to the operations A, B, C, . . . , and these relationships are defined by the storage resource defining portion 15 and are stored in the storage resource information memory 16.

Therefore, the storage reservation rule expresses the corresponding relation between the names of the operations and the storage volume groups.

The file allocation processing portion 18 which performs the file allocation process in the job management of an operating system calls the rule driver 14 when a job that is part of an operation makes an allocation request of the storage region for the file. In response to this, the rule driver 14 read out the storage reservation rule from the reservation rule memory 12 and executes its rule. By executing the storage reservation rule, the operation is identified according to job information such as accounting information, a job name, a file name, or a user identification (ID) code, and the storage volume group corresponding to the operation is determined.

The file allocation processing portion 18 calls the storage selector 19 by indicating the group name as determined above. The storage selector 19 outputs a request to the storage resource information manager 17 to allocate a storage volume included in the indicated group, and the storage resource information management portion 17 determines the storage volume included in the group with reference to the contents of the storage resource information memory 16 and informs the determined storage volume to the storage selector 19. The storage selector 19 informs the storage volume, and the file allocation processing portion 18 allocates a region in the informed storage volume to the file.

The overall constitution of the storage management system of the computer according to the present invention is described in above. Hereinafter, practical operations are described.

Figure 4:
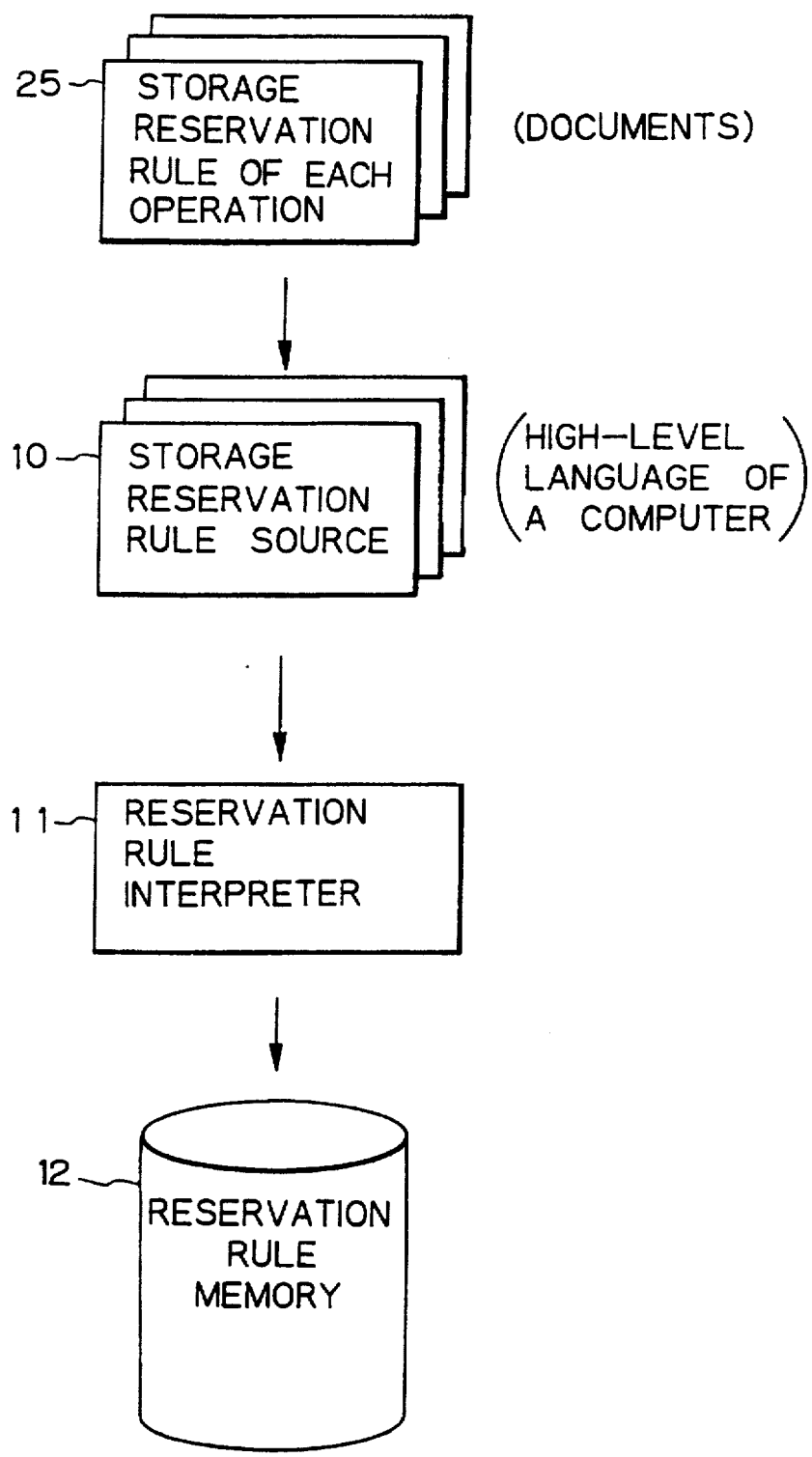
FIG. 4 is a diagram for explaining a registration method of storage reservation rules in the embodiment of FIG. 3.

FIG. 4 is a diagram for explaining a registration method of the storage reservation rule in the embodiment.

As shown in FIG. 4, first, normal operations are classified, and then, the relationship between the operations and the storage volumes are determined. Usually, this relationship is determined when the computer system is implemented, however, it can be amended by a computer system manager. Further, individual storage reservation rules of respective operations are respectively determined. Contents of these storage reservation rules are described by a language which is prepared in the computer for describing the storage reservation rules. In this way, the storage reservation rule source program 10 is completed. This storage reservation rule source program 10 is compiled by the reservation rule interpreter 11 to be expressed in machine language, and it is then stored in the reservation rule memory 12.

Figure 5:
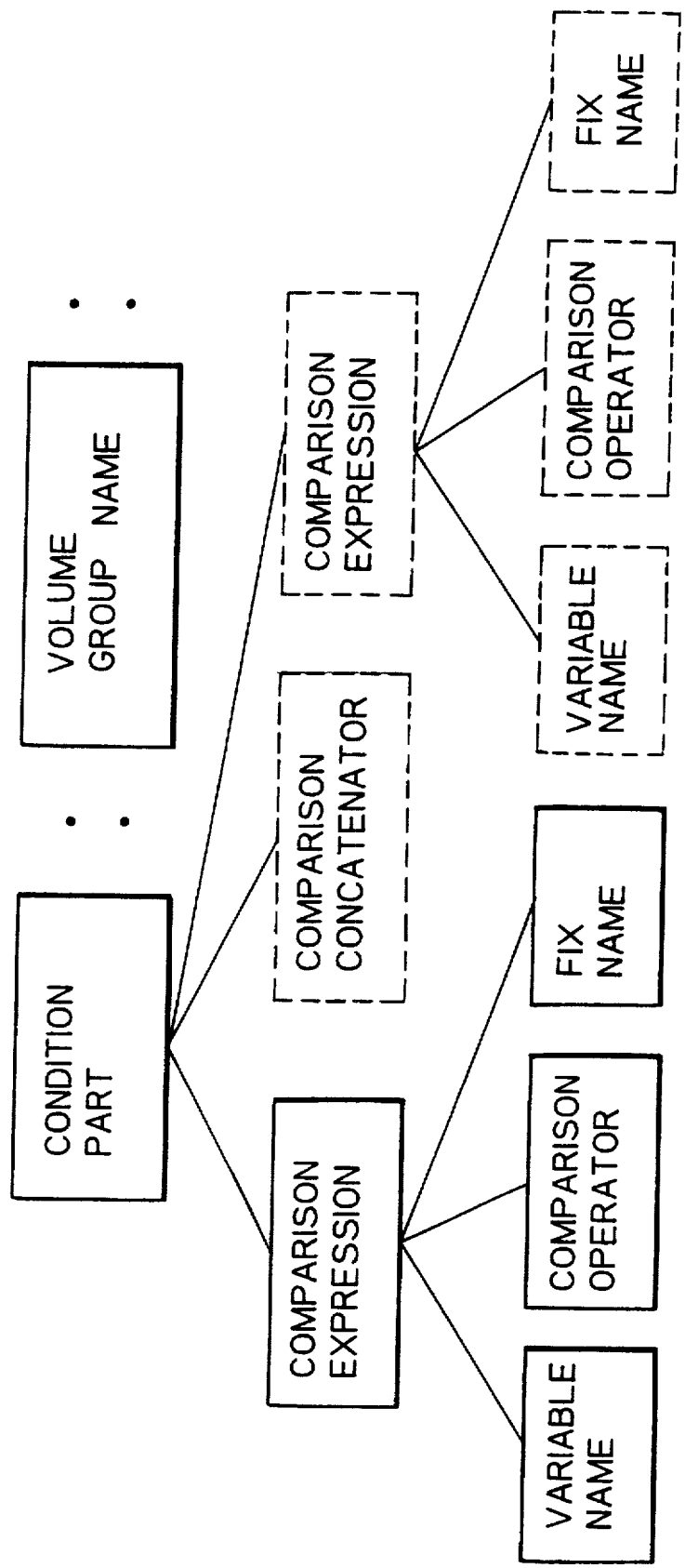
FIG. 5 is a diagram for explaining a statement of the storage reservation rules of the embodiment of FIG. 3.

FIG. 5 is a diagram for explaining a statement format of the storage reservation rule of the embodiment. In FIG. 5, frames designated by broken lines can be omitted.

The statement is composed of a condition part and a volume group name, and a colon (:) is used as a separator to separate the condition part and the volume group name, and a semi-colon (;) is used as an end of statement symbol. The condition part is composed of a comparison expression and a comparison concatenator. In the comparison expression, a variable name and a fixed name are coupled by a comparison operator. The comparison concatenator couples the comparison expressions. Although it is not shown in FIG. 5, a plurality of condition parts can be coupled by colons. When condition parts are coupled, the condition parts become hierarchical. When the hierarhy of the condition parts is established, the hierarhy is interrupted by the semi-colon.

In the following, components of the statement are shown.

(1) comparison concatenator

| (symbol) | & | (meaning) logical multiply |
|---|---|---|
| (symbol) | \| | (meaning) logical add |

(2) comparison operator

| (symbol) | = | (meaning) equal |
|---|---|---|
| (symbol) | <= | (meaning) equal or less than |
| (symbol) | >= | (meaning) equal or more than |
| (symbol) | < | (meaning) less than |
| (symbol) | > | (meaning) more than |

| (symbol) | != | (meaning) not equal |
|---|---|---|

(3) separation symbol

| (symbol) | : | (meaning) separate the condition parts, or separate the conditions part and the volume group name |
|---|---|---|
| (symbol) | ; | (meaning) end of statement |
| (symbol) | ' | (meaning) start and end of the fixed name and the volume group |
| (symbol) | " | (meaning) start and end of a message |
| (symbol) | ( ) | (meaning) start and end of the comparison expression |

(4) variable names

| (name) ACCOUNTJ (abbreviation) ACTJ | |
|---|---|
| | (meaning, etc.) job accounting information |
| (name) ACCOUNTS (abbreviation) ACTS | |
| | (meaning, etc.) accounting information of a job step, regarded as blank when no indication is in JCL |
| (name) DSNAME (abbreviation) DSN | |
| | (meaning, etc) file name indicated by user |
| (name) GROUP (abbreviation) GRP | |
| | (meaning, etc.) group name to which a user belongs |
| (name) JOB | |
| | (meaning, etc.) job name (under TSS system, an user identifier) |
| (name) USER | |
| | (meaning, etc.) a user identifier |

(5) fixed name

The fixed name is a row of characters equal to or less than 255 which are enclosed by single quotation marks ('), and which indicates a comparative object of a user environment. For example, in the case of the variable name ACCOUNTJ, job accounting information is indicated by enclosing it with single quotation marks as the fixed name. The following symbols are also used for generic names used as fixed names.

| (symbol) | ? | (meaning) | expresses a character including no period |
|---|---|---|---|
| (symbol) | * | (meaning) | expresses a row of characters of arbitrary length longer than one character including no period |
| (symbol) | ** | (meaning) | expresses a row of characters of arbitrary length longer than one character including a period |

Figure 7:
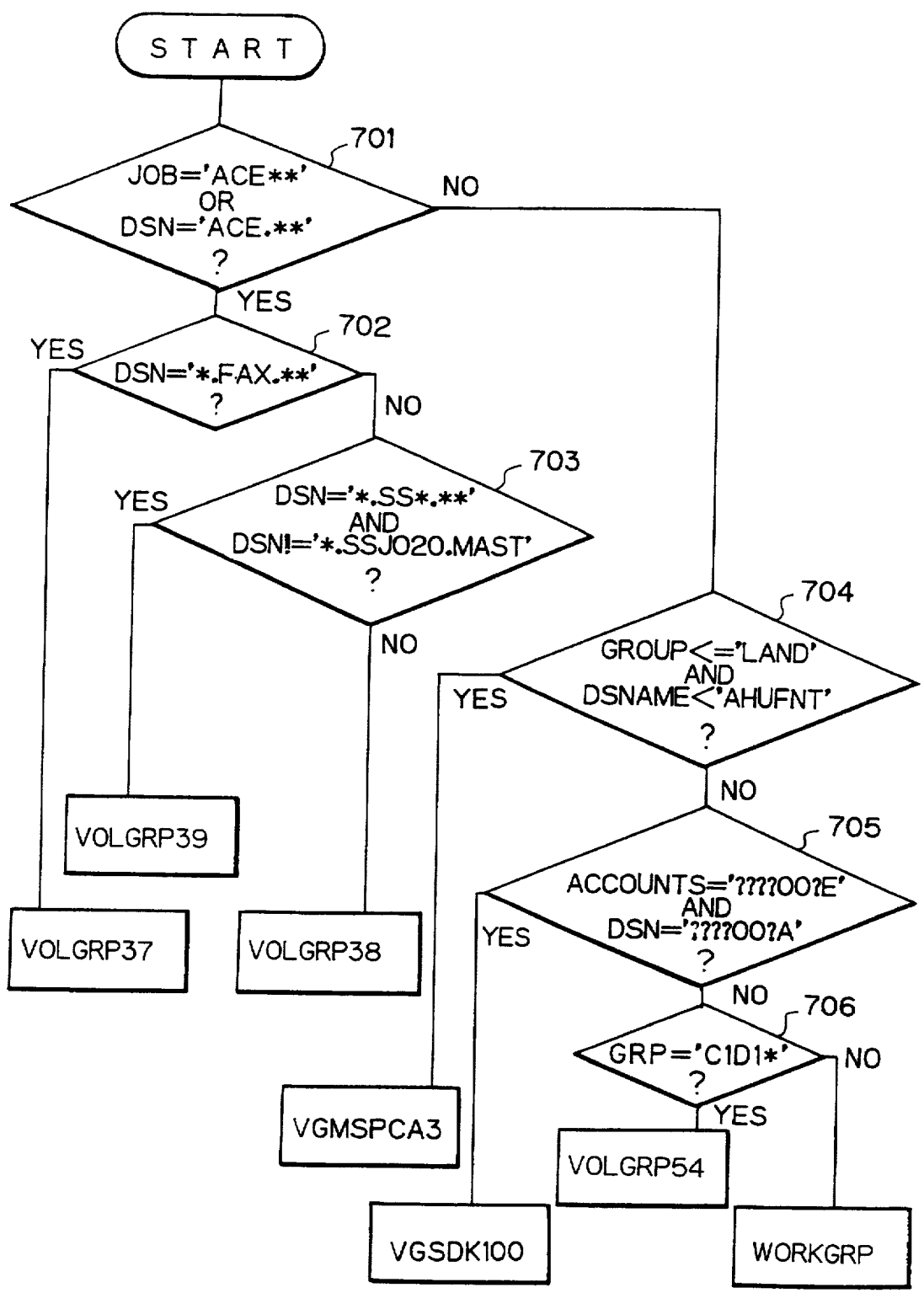
FIG. 7 is a flowchart showing the flow of the storage reservation rule source shown in FIG. 6.

FIG. 6 shows an example of the storage reservation rule source 10 which is made according to the above grammar of the storage reservation rule descriptive language. The reservation rule interpreter 11 transforms the storage reservation rule source program 10 shown in FIG. 6 into machine language. The interpreted rule is stored in the reservation rule memory 12. FIG. 7 is a flowchart showing the operation of the storage reservation rule shown in FIG. 6. Hereinafter, this operation is explained.

At step 701, it is judged whether or not the job name of the character row starts with "ACE", and also whether or not the file name starts with "ACE.". The control advances to a step 702 when the job name of the character row starts with "ACE" or the file name starts with "ACE.", and the control advances to a step 704 when the job name of the character row does not start with "ACE" and the file name does not start with "ACE.".

At step 702, it is judged whether or not the file name includes ".FAX". The name of the volume group allocated to the job is VOLGRP37 when the file name includes ".FAX", and the control advances to a step 703 when the file name does not include ".FAX".

At step 703, it is judged whether or not the file name includes ".SS*." (* is any arbitrary character), and also whether or not the end portion of the file name is equal to ".SSJ020.MAST". When the file name includes ".SS*." and the end portion of the file name is equal to ".SSJ020.MAST", the name of the volume group allocated to the job is VOLGRP39. When the file name does not include ".SS*." or the end portion of the file name is not equal to ".SSJ020.MAST", the name of the volume group allocated to the job is VOLGRP38.

At step 704, it is logically judged whether or not the length of the group name is equal to or less than "LAND", and also whether or not the length of the file name is less than "AHUFNT". The name of the volume group allocated to the job is VGMSPCA3 when the group name is equal to or less than "LAND", and the file name is less than "AHUFNT". The control advances to a step 705 when the group name is larger than "LAND", or the file name is equal to or larger than "AHUFNT".

At step 705, it is judged whether or not the accounting information of the job step is "????00?E" (? is any arbitrary character except ?), and also whether or not the file name is "????00?A". The name of the volume group allocated to the job is VGSDK100 when the accounting information of the job step is "????00?E", and the file name is "????00?A". The control advances to a step 706 when the accounting information of the job step is not "????00?E", or the file name is not "????00?A".

At step 706, it is judged whether or not the indicated group name starts with "C1D1". The name of the volume group allocated to the job is VOLGRP54 when the indicated group name starts with "C1D1". The name of the volume group allocated to the job is WORKGRP when the indicated group name does not start with "C1D1".

As shown above, by executing the storage reservation rule, the appropriate volume group name is automatically selected by using the job accounting information, file name (data set), job name, etc..

Figure 8:
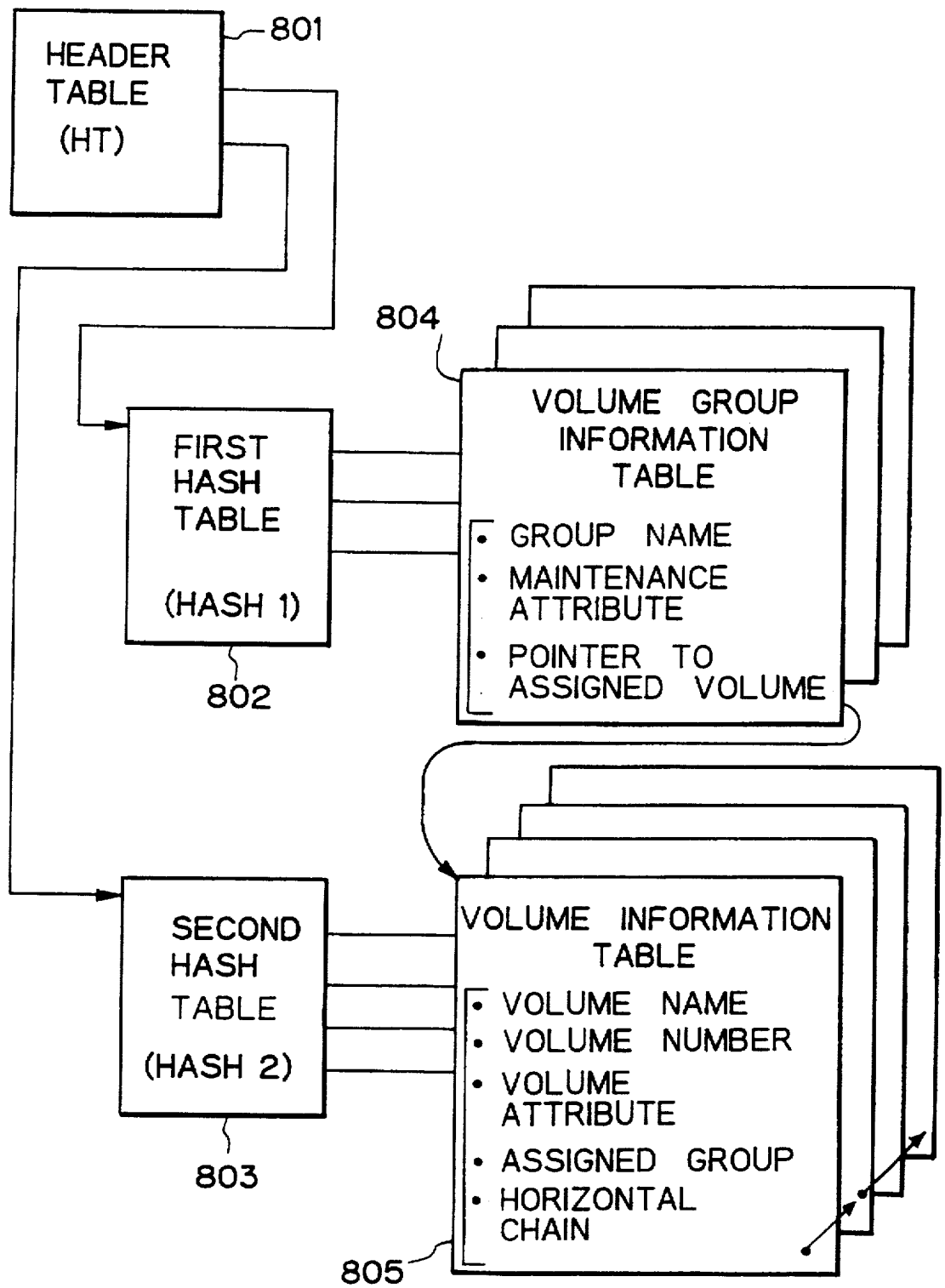
FIG. 8 is a diagram showing an example of data constitution of the storage resource information.

FIG. 8 shows an example of data constitution of the storage resource information stored in the storage resource information memory 16 shown in FIG. 3.

A header table (HT) 801 points to a first hash table (HASH1) 802 which points to volume group information tables (VGIT) 804, and a second hash table (HASH2) 803 which points to volume information tables (VIT) 805. Each volume group table 804 has information of each volume group respectively classified by operations, and this information has a related volume group name for discriminating the appropriate volume group, maintenance attribute information relating to a space management attribute of the storage included in that volume group, and pointer information for the assigned group.

Each volume information table 805 has information of each volume such as a volume name, a volume number, volume attribute information such as volume capacity, an assigned group, a horizontal chain to another volume information table, and so forth.

The definition of the volume group for making the volume group table 804 is carried out by the storage resource defining portion 15. Particularly, the following attributes can be defined for each volume group as the maintenance attribute information.

(1) accessible host

This indicates identifiers of accessible host computers. The host computer indicated at the top of a list becomes a manager host computer, and that manager host computer performs the space management procedure and the back-up procedure.

(2) space assurance (i) temporary/dynamic volume reorganization attribute

This indicates whether or not a temporary volume reorganization, a dynamic volume reorganization, or a temporary volume compaction are to be carried out.

(ii) temporary volume reorganization attribute

This indicates a minimum secured space capacity, a normal secured space capacity and a control block number of an unused data set. The minimum secured space capacity is a minimum space capacity which is required to be always secured in the volume. The normal secured space capacity is a space capacity which is desired to be normally secured in the space. The control block number of an unused data set indicates a rough number which can be newly made in the volume. The temporary volume reorganization is performed for the volume of which vacant space is less than the minimum secured space or the volume in which the control block number of the unused data set is less than the indicated number. When the vacant space capacity of the volume becomes less than the minimum secured space capacity, a space capacity equal to the normal secured space capacity is secured.

(iii) temporary volume compaction attribute

This indicates a fragmentation degree. The fragmentation degree indicates a ratio of a maximum space capacity secured as a first capacity to the total vacant space capacity of the volume. The temporary volume compaction-is performed on the volume which has a fragmentation degree more than an indicated ratio.

(iv) scratch attribute of an unnecessary data set

This indicates a period of availablility of the data set. In the embodiment, this can be indicated by a period from when data of a data set is made, or a period from the final reference date. A data set which is not used over these periods is discarded.

(v) release attribute of unused space

This indicates a threshold of remaining vacant space ratio when the unused space is released. The unused space of a data set of which a ratio of vacant space becomes over this threshold is released.

(vi) extension coupling attribute

This indicates a threshold of a permissible extension number of the extension coupling. This procedure is performed on a data set that is over this extension number.

(vii) compaction attribute of a divided data set

This indicates a threshold of a renewal number of the compaction of the divided data set. This procedure is performed on the data set in which the number of renewals and releases is more than the indicated number.

(viii) directory extension attribute of a divided data set

This indicates a number of addable members which can always be addable into a divided data set. This directory extension procedure is performed on a data set to which members of the indicated number cannot be added. However, since the size of the extended directory portion is calculated from the directory sizes of existent members, this operation is not performed on a data set in which the number of members is zero.

(ix) compaction attribute of the dynamic data set

This indicates whether or not dynamic compaction of the divided data set is performed. The number of addable member is to be also indicated.

(3) migration (i) migration attribute

This indicates a threshold of a period at which the migration is carried out. This period is indicated in days. The migration procedure is performed on a data set which has not been accessed over the indicated period of days.

(ii) automatic migration attribute

This indicates whether or not an automatic migration is to be carried out.

(4) back-up (i) back-up attribute

This indicates the frequency of the back-up and an edition number of a preserved back-up. The back-up frequency is a period of minimum number of days between back-up procedures. When a data set is renewed, the last back-up edition is loaded and this back-up procedure is performed for the data sets for which the last back-up has exceed the indicated number of days.

(ii) automatic back-up attribute

This indicates whether or not an automatic back-up is to be operated.

The maintenance attributes described above can be indicated in the volume group information table 804 of each volume group. Therefore, by classifying the volume groups for each operation, the volume space can be managed for all operations.

Figure 9:
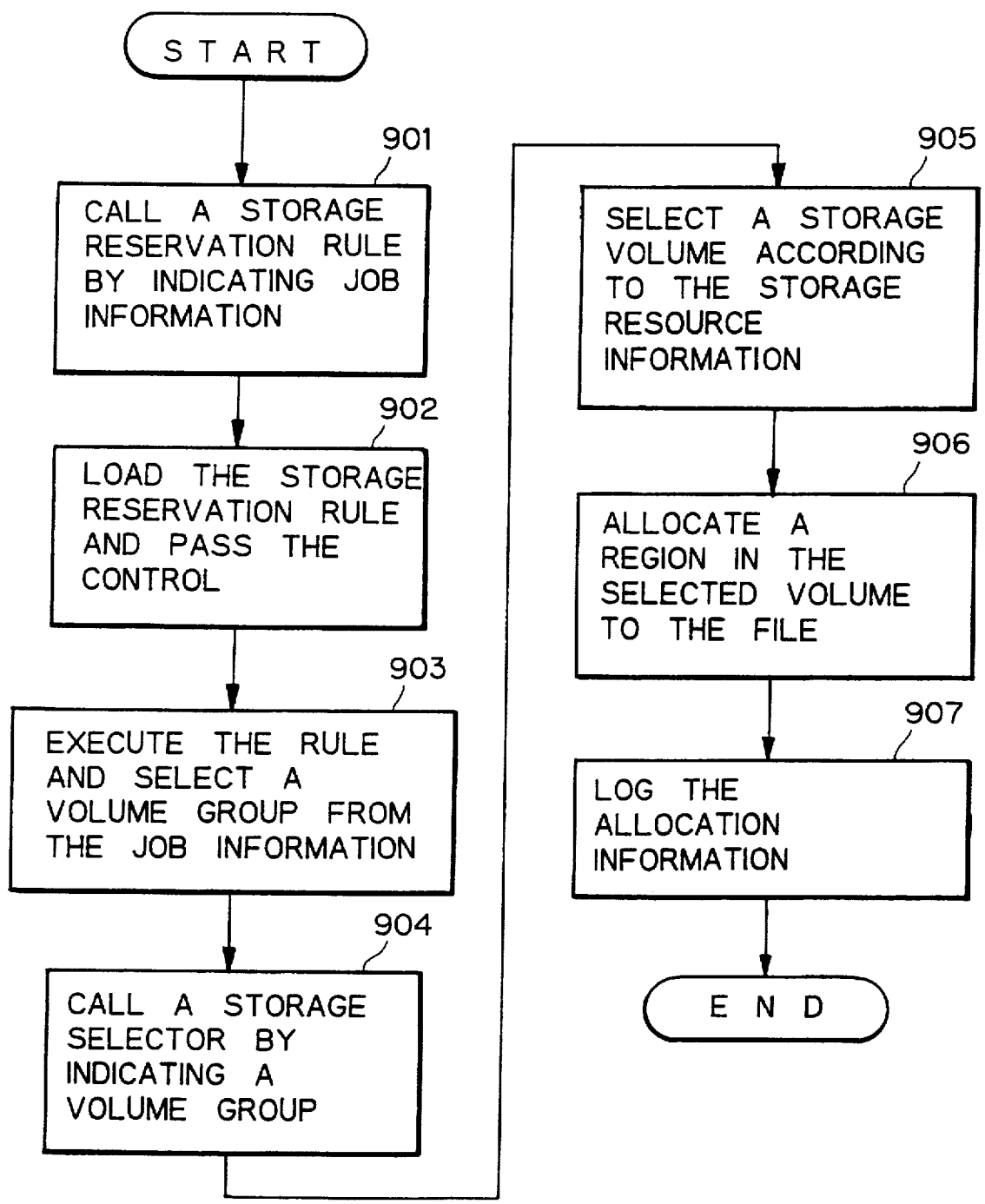
FIG. 9 is a flowchart showing an example of the storage allocation of the embodiment.

FIG. 9 shows an example of the storage allocation process of the embodiment. This example is explained with reference to FIG. 9.

At step 901, the file allocation processing portion 18 shown in FIG. 3 receives a storage allocation request and calls the rule driver 14 by indicating the job information such as the accounting information, the file name, etc..

At step 902, the rule driver 14 loads the storage reservation rule from the storage reservation rule memory 12 and passes the control to the rule executing portion 13.

At step 903, the rule executing portion 13 executes the reservation rule, and, according to the various job information, selects the volume group corresponding to the operation.

At step 904, the file allocation processing portion 18 calls the storage selector 19 by indicating the informed volume group.

At step 905, the storage selector 19 selects the apparatus (volumes) according to the storage resource information of the storage resource information memory 16.

At step 906, the file allocation processing portion 18 allocates a region in the selected apparatus (volumes) to the file.

At step 907, the allocation information is logged as the processing history information 21.

Figure 10:
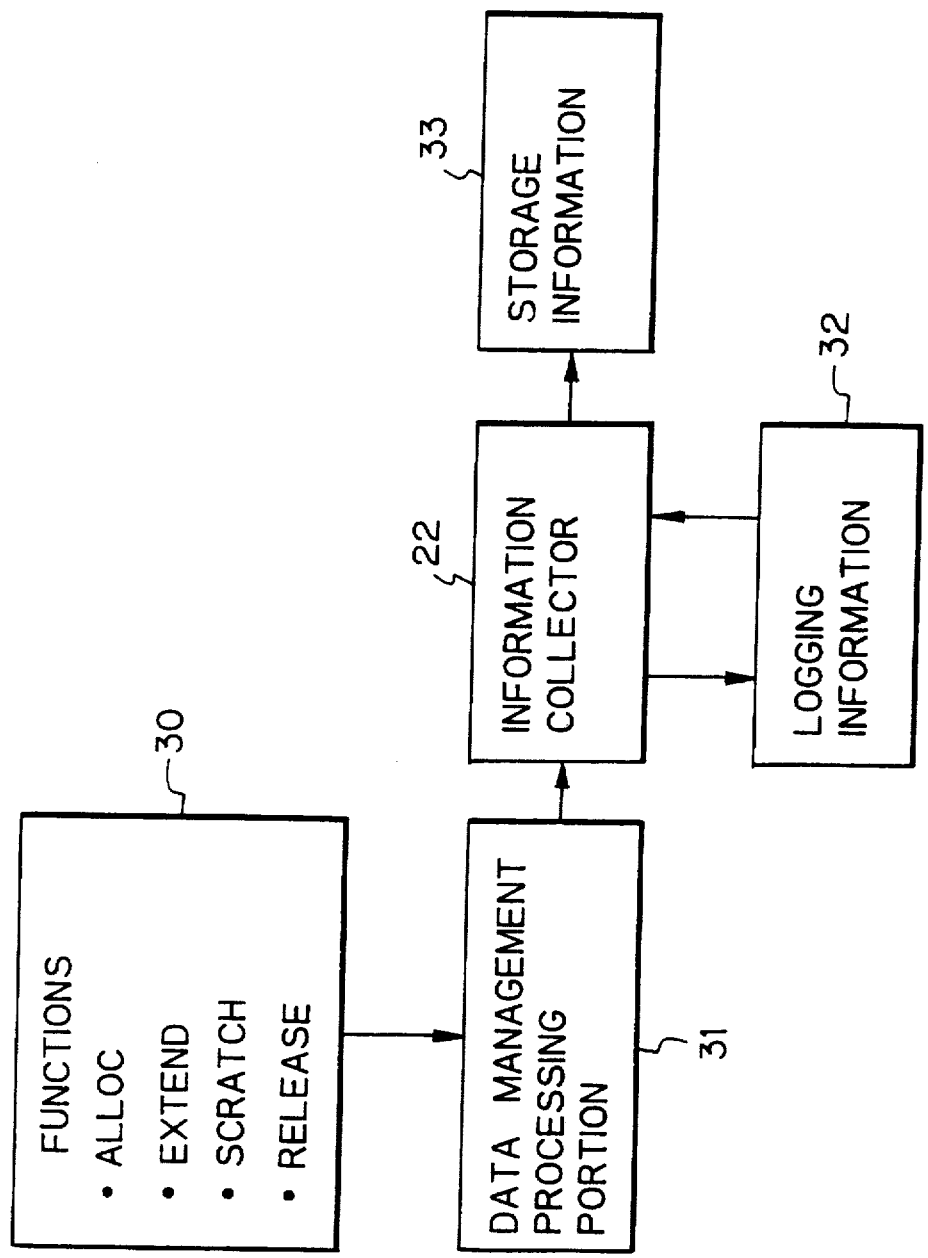
FIG. 10 is a diagram for explaining a storage information collection of the embodiment.
Figure 11:
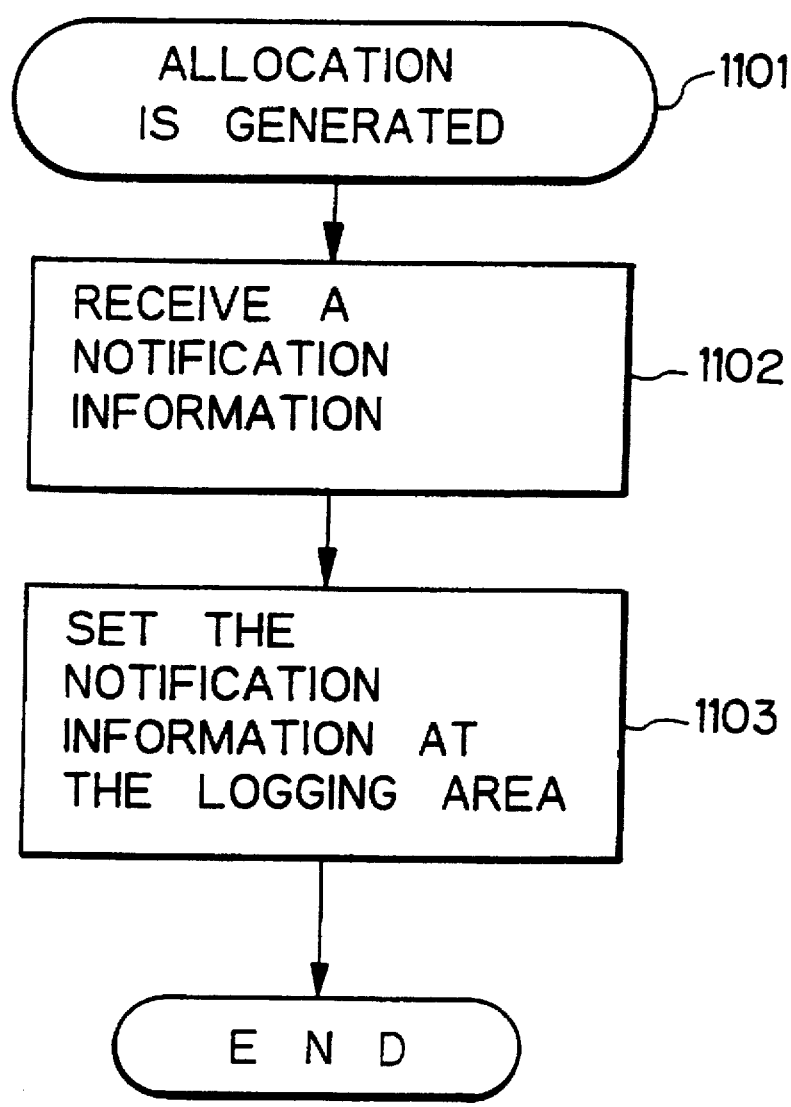
FIG. 11 is a flowchart showing an operation relating to the logging of the storage information by a storage information collecting portion.
Figure 12:
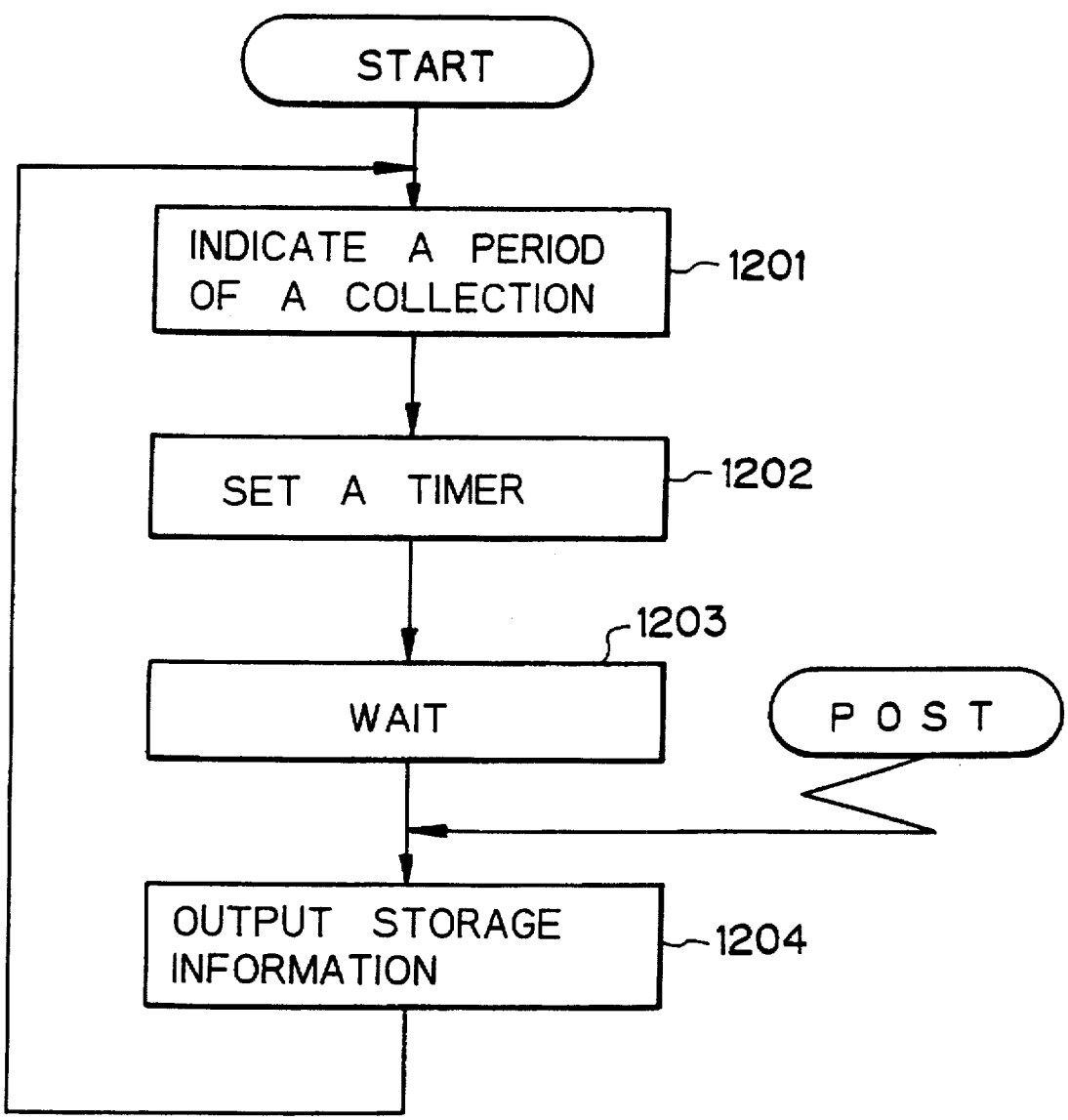
FIG. 12 is a flowchart showing a process of periodic information output from the information collection processing portion.
Figure 13:
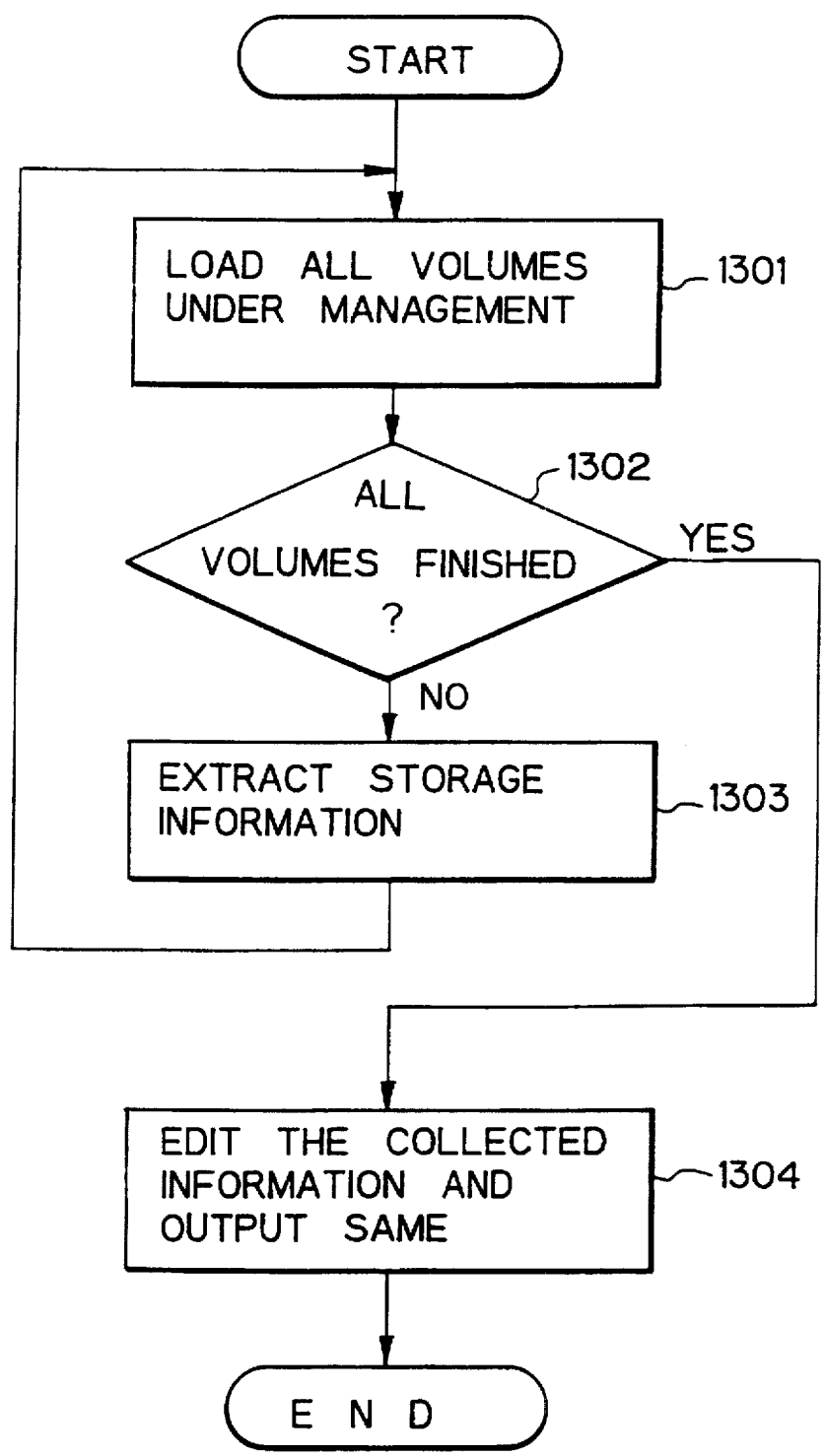
FIG. 13 is a flowchart showing a process of outputting the collected storage information from the information collection processing portion.

FIG. 10 is a diagram for explaining the storage information collection of the embodiment, FIGS. 11, 12 and 13 are flowcharts showing information collection processes.

In recent years, the amount of data processed by a host computer has steadily increased, and has also become more diverse, making practical use and management of the computer system very complicated. In order to realize practical use and management, the utilization state of the storage is required to be detected precisely and minutely.

Therefore, in the computer system of the embodiment, the utilized storage space capacity and trends in its change are detected for every operation, and this data is used as the fundamental data for the storage space allocation. Namely, the unit of the classification is the operation, and the total utilized storage space of each Operation is calculated. By performing the data collection at a constant period, the tendency to increase and decrease the total storage space utilized for each operation can be detected. According to these results, the total storage space and available storage space required by each operation are obtained.

As shown above, the classification of each operation can be performed by making the operations correspond to the volume groups.

For example, FIG. 10 is a diagram for explaining the storage information collection of the embodiment. In FIG. 10, reference numeral 31 designates a data management process, reference number 32 designates logging information, reference numeral 33 designates storage information. Further, reference numeral 30 designates functions relating to the storage information. The information collector 22 is that shown in FIG. 3.

As shown in FIG. 10, when processes relating to the storage allocation such as the space allocation (ALLOC), the space extension (EXTEND), the space scratch (SCRATCH), the space release (RELEASE) and so forth are generated, the information collector 22 is called at an output step from the data management to the job management of the data management processing portion 31, and the information collector 22 sets the storage information as the logging information.

FIG. 11 is a flowchart showing the process relating to the logging of the storage information by the information collector 22.

At step 1101, the process relating to the storage allocation described above is generated.

At step 1102, the information collector 22 receives notification information from the data management processing portion 31.

At step 1103, the information collector 22 sets that notification information in the logging area.

FIG. 12 is a flowchart showing a process of a periodic information output process of the information collector 22.

At step 1201, the processing period of the information collection is indicated.

At step 1202, a timer (TIMER) of the computer is set so that notifications come for each processing period.

At step 1203, the control waits until the indicated time passes and the timer notification comes.

At step 1204, when the timer notification (POST) comes, the information collector 22 performs the output process of the storage information. Then, the control returns to step 1201.

FIG. 13 is a flowchart showing a process of an output operation of the collected storage information of the information collector 22.

At step 1301, every one of volumes under management loaded.

At step 1302, it is judged whether or not the above processes of all volumes are finished. After the above process are finished for all volumes under management, the control advances to a step 1304.

At step 1303, the storage information of each volume is extracted.

At step 1304, the collected storage information is edited for each operation and then output.

Figure 14:
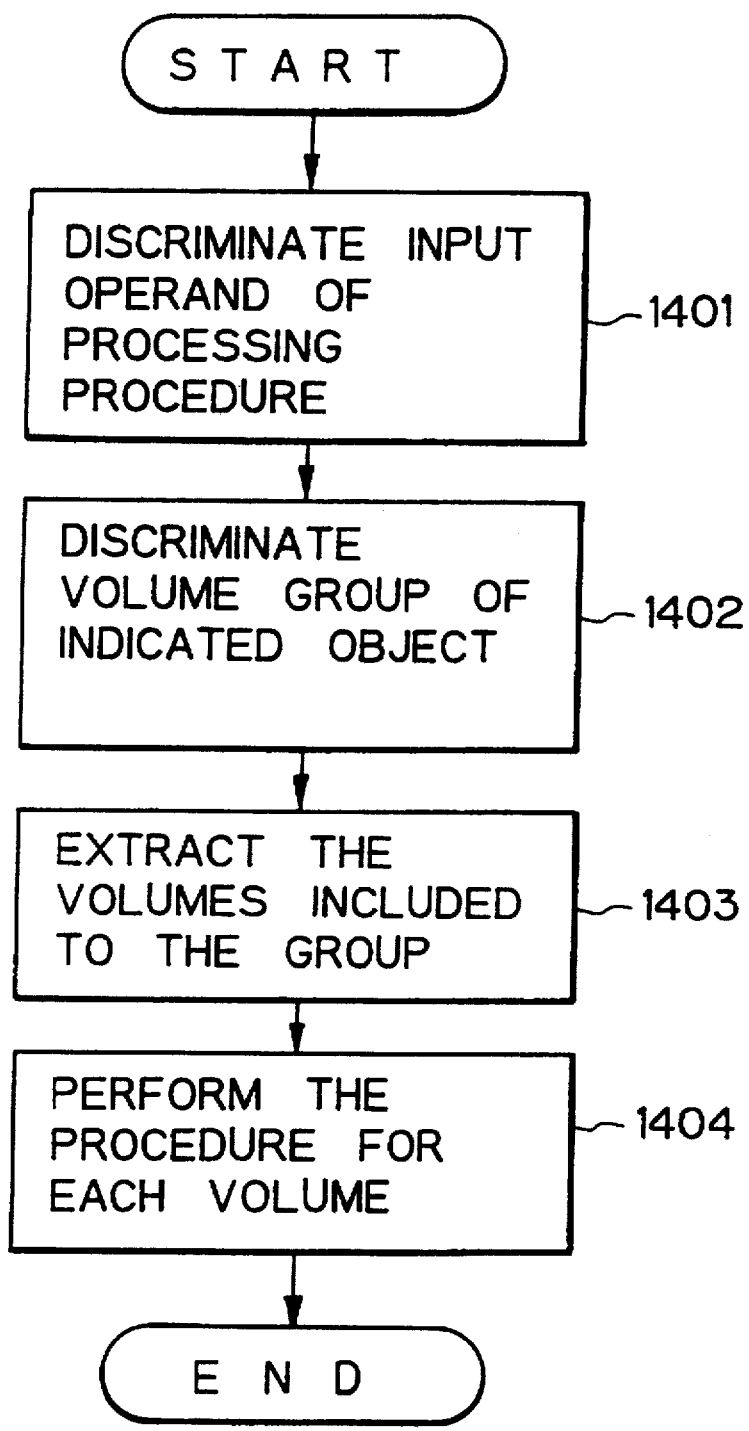
FIG. 14 is a flowchart showing a storage procedure of the embodiment.

FIG. 14 is a flowchart explaining the storage process of this embodiment.

As shown in FIG. 14, in the embodiment, it is judged whether or not the storage resources are under the management according to the volume group. The volume group is a scope within which all volumes are managed together, and each volume group has a name to identify the group. Therefore, all resources related to an operation can be processed together by indicating the group name.

In response to the operation requests for an operation unit such as the back-up, the arrangement in the storage, duplication, initialization, etc., the process shown in FIG. 14 is carried out.

At step 1401, an input operand of processing procedure is analyzed and discriminated.

At step 1402, the volume group of the indicated processing object is discriminated.

At step 1403, the volumes included in the indicated volume group are extracted according to the volume group information table 804.

At step 1404, the indicated procedures such as the back-up, the recovery, the arrangement in the storage, duplication, initialization and so forth are carried out for each volume.

Figure 15:
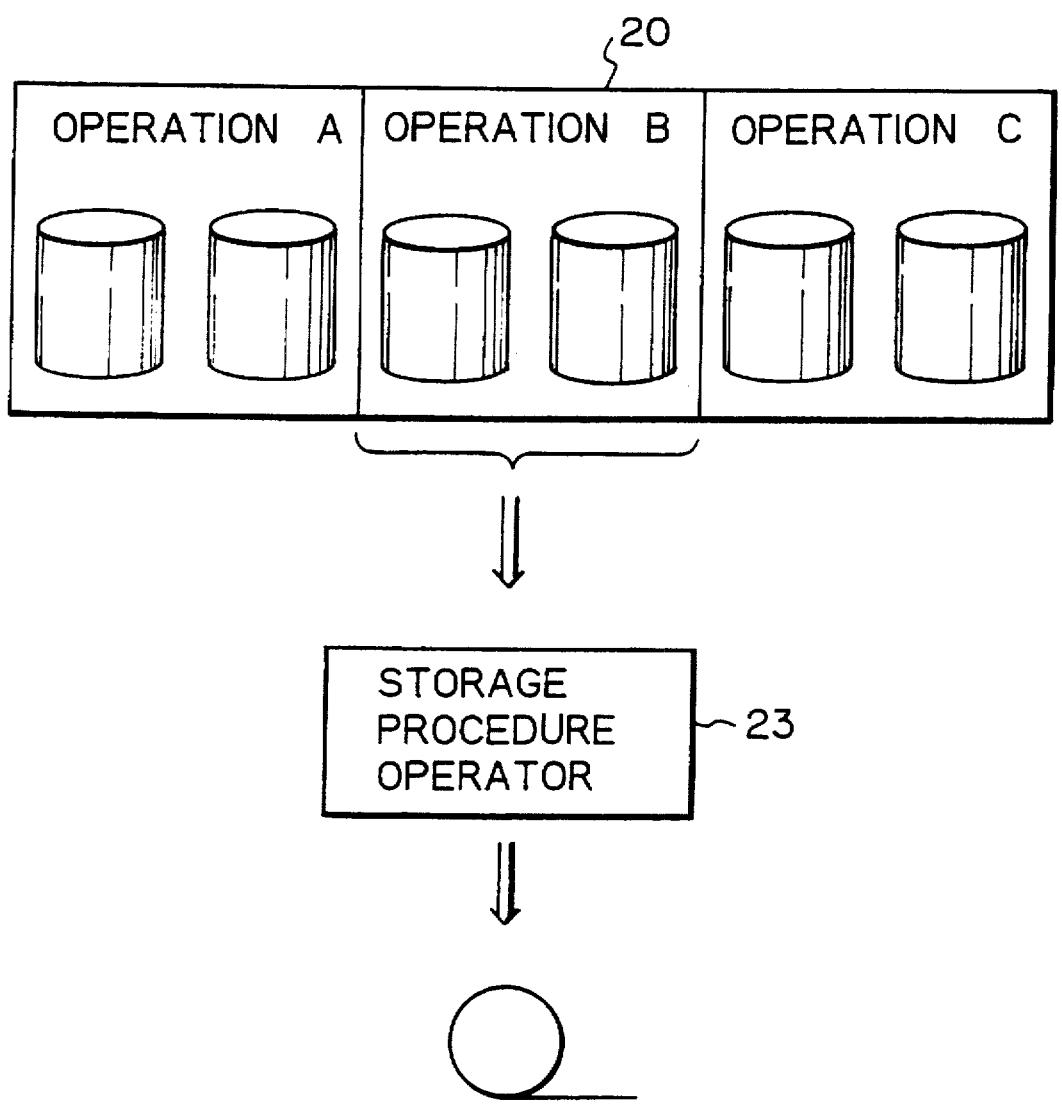
FIG. 15 is a diagram for explaining a storage procedure for each storage group.

FIG. 15 is a diagram for explaining the above processes. As shown in FIG. 15, by carrying out the above procedures, for example, only the back-up procedure for a certain operation B can be easily carried out by the storage procedure operator 23. In the computer of the prior art, the back-up procedures must be carried out for all volumes regardless of kinds of operations, or the back-up procedure for each operation can be carried out when the volumes under management for an operation are indicated according to the manually studied results. Therefore, the above procedures become easier in the computer of the present invention than that of the prior art.

By defining the storage space attributes in the volume group information table 804 shown in FIG. 8, the following space assurances are available.

(1) total space security (i) volume reorganization

This totally performs functions included the space assurance procedure for the volume, and secures the vacant space of the volume.

(ii) data set reorganization

This totally performs functions included the space assurance procedure for the data set, and secures the vacant space of the volume.

(2) prevention of subdivision of the vacant space of the volume.

(i) volume compaction

Volume compaction collects the subdivided vacant spaces existing in various areas of a volume, and a contiguous vacant space is secured.

(3) vacant space security (i) scratch unused data set

A data set which is judged to be unused is discarded (scratched).

(ii) release of unused space in a data set

The unused space of a data set which is judged to have a large unused space is released.

(4) removing limit of an extension number (i) extension coupling of a data set

The extension of data sets which are judged to have many extension numbers are coupled as much as possible.

(5) improvement of the available space ratio of a divided data set (i) compaction of a divided data set The unavailable space in a divided data set which has wide unavailable space generated by the renewal and the discard of the menu is removed.

(6) removal of a limit of the number of members addable to a divided data set (i) directory extension of a divided data set The directory portion of a data set of which the number of addable members is judged to be small is extended.

Figure 16:
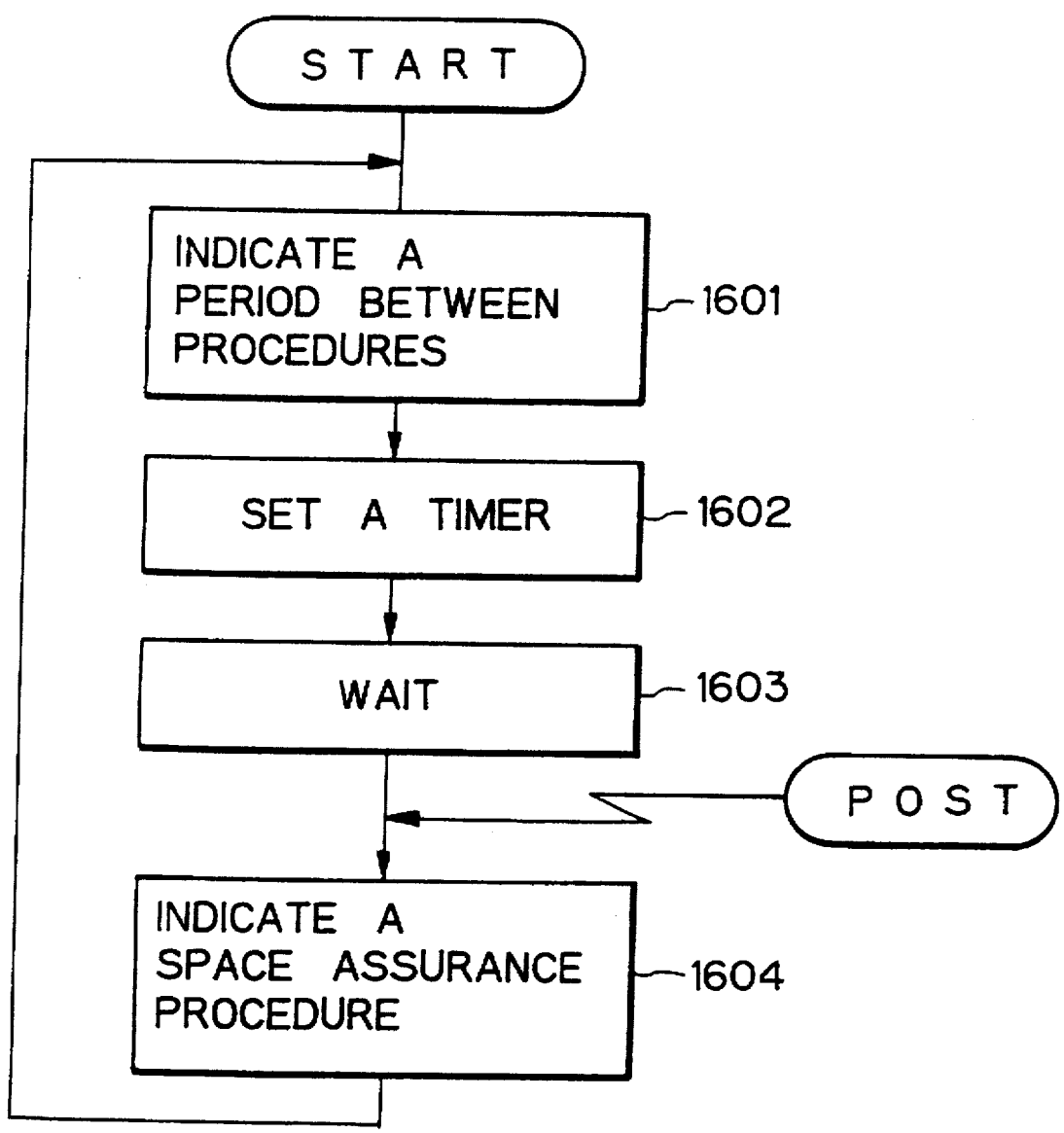
FIG. 16 is a flowchart showing operations relating to space management.

FIG. 16 is a flowchart showing procedures relating to the space management.

At step 1601, a processing time period for space assurance is indicated.

At step 1602, a timer (TIMER) of the computer is set so that notifications come for every processing period.

At step 1603, the control waits until the indicated time passes and the timer notification comes.

At step 1604, when the timer notification (POST) comes, the space assurance function is performed. Then, the control returns to step 1201.

Figure 17:
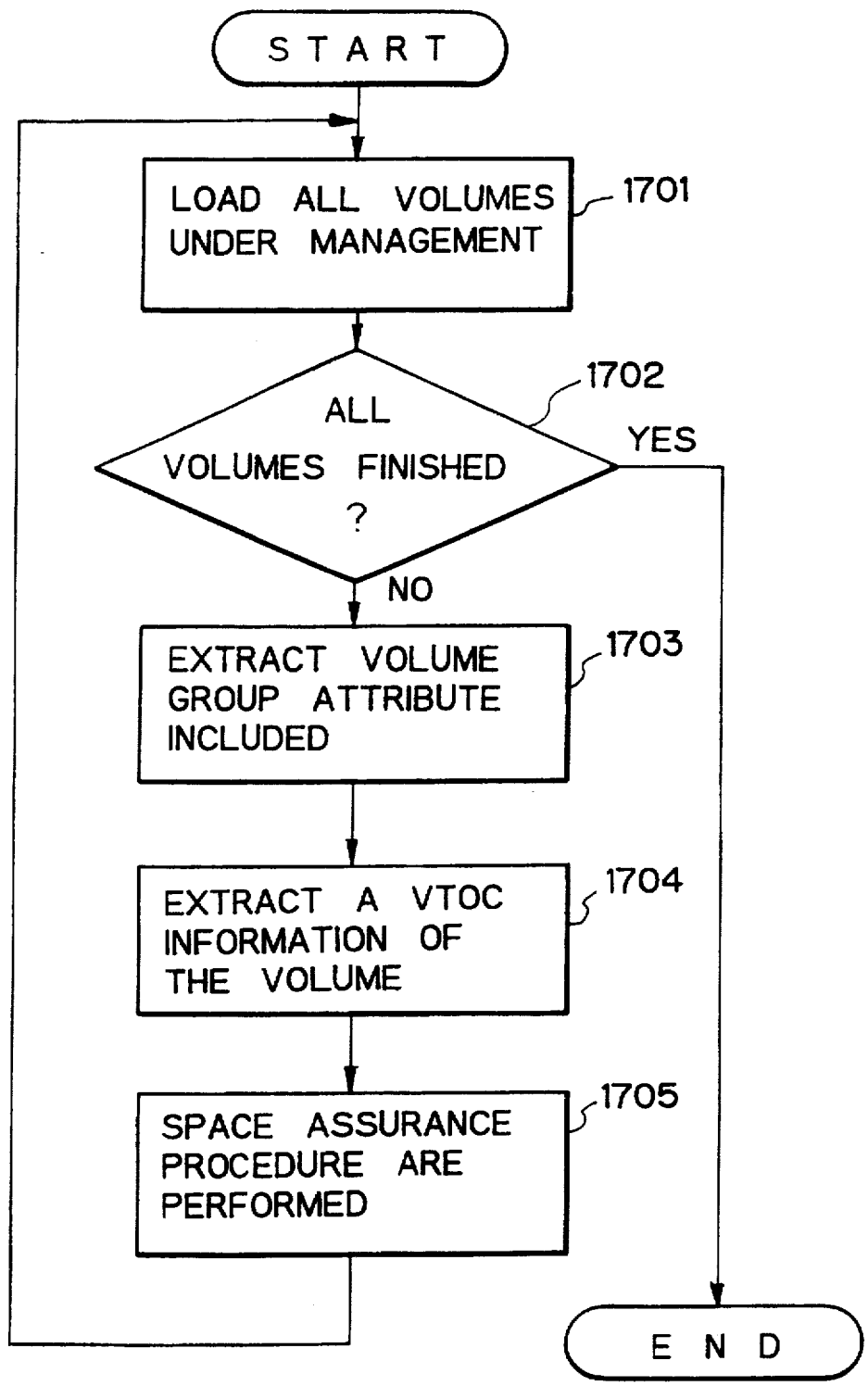
FIG. 17 is a flowchart showing a space assurance procedure.

FIG. 17 is a flowchart showing a space assurance procedure.

At step 1701, all volumes under management are loaded.

At step 1702, it is judged whether or not the above procedures for all volumes are finished. After the above procedures are finished for all volumes under management, the procedure finishes.

At step 1703, the maintenance attribute of the volume group including the volume is extracted.

At step 1704, volume table of contents (VTOC) information of the volume is extracted.

At step 1705, all of the space assurance procedure are carried out according to the maintenance attributes of the volume group.

An embodiment of a volume reorganization carried out at regular time intervals is explained as this space assurance function. By the volume reorganization at regular time interval, procedures such as volume compaction, unused data discard (scratch), release of the unused space in the data set, extension coupling, compaction of the divided data set, directory extension of the divided data set and so forth are carried out at regular intervals for all volumes registered in the volume group.

In the volume reorganization carried out at regular intervals, the load can be dispersed, for example, by limiting time zones, days, volume groups, etc., for which reorganization is carried out. FIG. 18 is a diagram showing an example of a definition of volume reorganization. This definition can be defined by a TSS command.

The reorganization period is defined by indicating a day of the week at which the procedure is carried out. A symbol "Y" designates a day of the week when the procedure is carried out, and a symbol "N" designates a day of the week when the procedure is not carried out. As the start day, for example, the date of the Monday of the week when the procedure starts may be specified. Further, a start time, a wait time for a response, and an end time are respectively indicated.

The start time designates a time when the procedure of the volume reorganization at regular intervals starts. The wait time for a response designates a time for a waiting a response from an operator after the output of a confirmation message to the operator. If the response is not received within this time, the volume reorganization at regular intervals is not carried out. If the operator confirmation does not apply, this time is unrelated to this procedure. The finishing time designates a time when the volume reorganization at regular intervals is finished by force. When the procedure of the volume reorganization at regular intervals continues until this time, procedures except of the data set under the procedure are finished. The reorganization time can be defined eight times relating to one volume group.

According to the definition shown in FIG. 18, the reorganization of the volume group A is carried out from eight o'clock to ten o'clock every Monday, the reorganization of the volume group B is carried out from eight o'clock to ten o'clock of every Tuesday, the reorganization of the volume group C is carried out from nine thirty to eleven thirty every Wednesday and Saturday, the reorganization of the volume group D is carried out from four o'clock to five thirty every Thursday, the reorganization of the volume group E is carried out from four o'clock to five thirty every Wednesday, and the reorganization of the volume group F is carried out from eight o'clock to nine o'clock everyday.

The temporary volume reorganization is a function which watches the space state in a volume and always secures a space having a constant vacant capacity. The temporary volume reorganization is started when the total vacant space becomes less than the indicated reference capacity, and it discards an unused data set or releases unused space in the data set.

Figure 19:
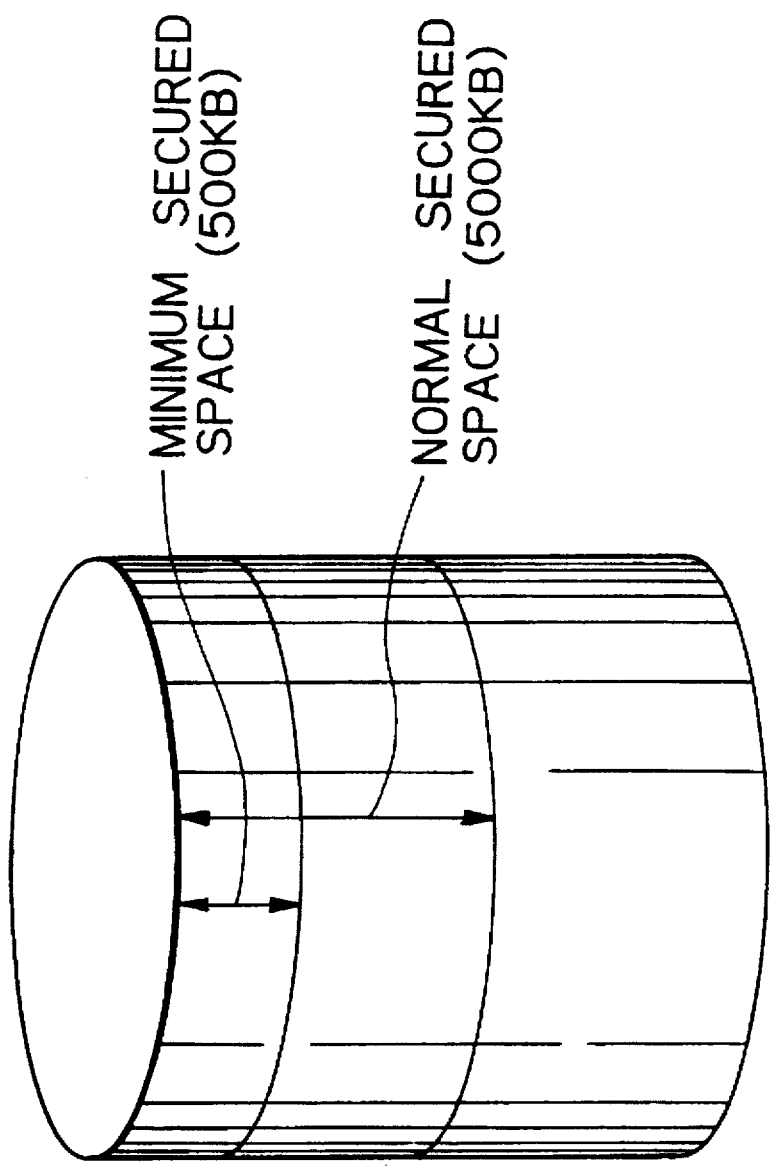
FIG. 19 is a diagram for explaining a temporary volume reorganization.

For example, as shown in FIG. 19, if a capacity 500KB is indicated as the minimum secured space capacity, the temporary volume reorganization is started when the vacant space becomes less than 500KB. Further, if the capacity 5000KB is indicated as the minimum secured space capacity, the temporary volume reorganization performs volume reorganization so as to secure a vacant space of the capacity 5000KB.

In addition to the above procedures, there is a dynamic volume reorganization as a space assurance function. The dynamic volume reorganization is a function that, in response to a space security request, performs the corresponding volume reorganization. When a space security request is over the vacant space capacity in the volume, this function secures the vacant space by discarding unused data sets or releasing the unused space in a data set.

The volume compaction by the volume reorganization is a function that collects unused space scattered across volume, and this volume compaction functions so as to prevent a problem in that space cannot be secured even when enough vacant space exists in total in the volume. The volume compaction function has an effect that the data set is divided with extension.

Figure 20A:
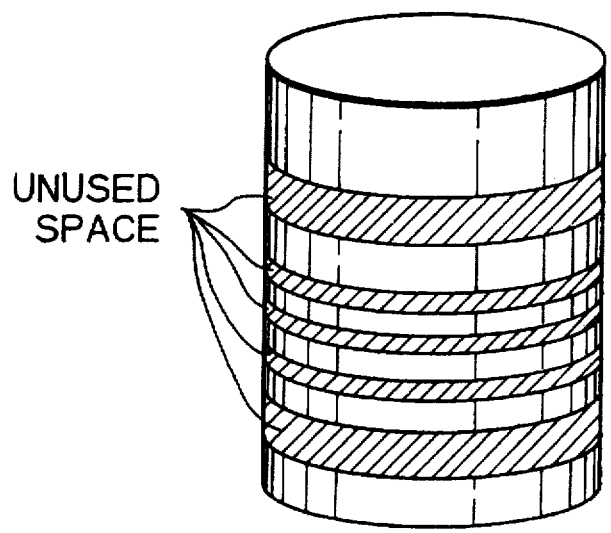
FIGS. 20A and 20B are diagrams for explaining a volume compaction function.
Figure 20B:
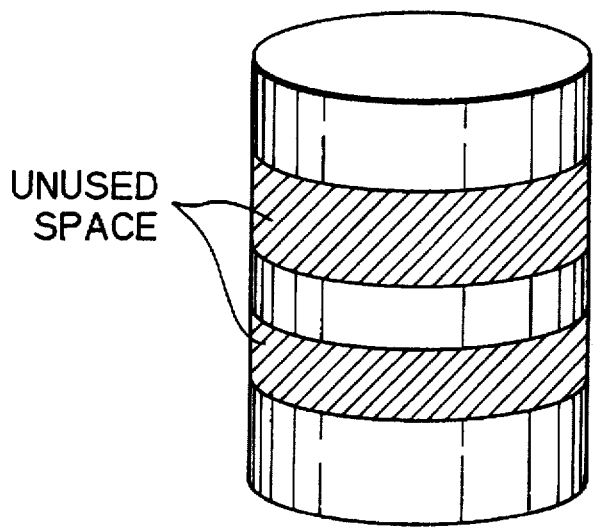

FIGS. 20A and 20B are diagrams explaining the volume compaction function. In FIGS. 20A and 20B, the unused spaces in the volume are designated by hatching. A state of the volume shown in FIG. 20A before the volume compaction procedure is changed to that shown in FIG. 20B by the volume compaction procedure. Namely, the unused spaces are collected. In this way, a large contiguous vacant space is achieved.

A degree of fragmentation is one of the defined items of this volume compaction. The fragmentation degree is an index showing the degree of division of the volume, and it is derived according to the following formula.

$$fragmentation\ degree = (1 - A/B) \times 100$$

wherein, A is a maximum securable space capacity as a first-order, and B is a total vacant space capacity in the volume.

Further, the unused data set discard is a function that discards a data set that exceeds a certain available period as an unused data set according to the maintenance attributes of the volume group the data set belongs to. In this way, unnecessary data sets left unused are discarded.

The available time period for the discard of unused data sets can be defined by indicating days from the last reference day or from that specific day.

The release of the unused space in a data set is a function for releasing the data set spaces which are not used because more space was secured than it necessary. By this function, no data set secures more capacity than it needs. A residual ratio of the vacant space shows a ratio of the vacant space to the total space secured to the data set. When the residual ratio of the vacant space is larger than a defined value, the vacant space of that data set is released.

In addition to the above items of the reorganization, for example, there are other items such as a compaction of divided data sets, extension coupling of data sets, a directory extension of divided data sets, etc.

As shown above, the space management of the storage can be performed for all volume groups, namely, for every operation in this invention.

As described in above, according to the present invention, the following effects are obtained.

By installing the storage reservation rules within the storage selecting function of the computer system, a user is not required to recognize the storage reservation rules, and the storage units are automatically and surely selected according to the object of the use. Further, efficient storage utilization in accordance with a storage utilization plan corresponding to normal operations is realized.

Since storage information classified by operations can be obtained, the obtained information can be directly analyzed without the classification of the storage information. In this way, a recognition of a utilization state of the Storage and a utilization plan for the storage can be efficiently achieved.

Since the storage management with an operation unit is available, all storage units related to an operation can be managed at once without indicating a volume number of the storage. In this way, the storage management of each operation can be efficiently performed.

Since the space management can be performed with the storage units, a finer management corresponding to each operation can be performed. Further, automatic storage space arrangement can be performed according to the space management attribute information, so the analysis of the utilization state of the space is not required.

I claim:

1. A data processing apparatus comprising:

an external storage device including a plurality of storage units, said plurality of storage units being previously classified into a plurality of storage unit groups, and said plurality of storage unit groups being previously reserved for a plurality of job groups corresponding to a plurality of normal operations, respectively;

storage reservation rule storing means for storing storage reservation rules expressing a relationship between partial character strings of job names respectively corresponding to said plurality of job groups and said plurality of storage unit groups; and storage allocation means for selecting one of said plurality of storage unit groups corresponding to one of said partial character strings of job names which is input with a storage request of a file of one of said corresponding job groups based on a corresponding one of said storage reservation rules, and for allocating at least one of said plurality of storage units included in said selected one storage group to said one job group.

2. A data processing apparatus as set forth in claim 1, further comprising:

storage information processing means for generating information relating to a storage capacity of each of said storage unit groups and a change in said storage capacity of each of said storage unit groups from said storage reservation rules of said storage reservation rule storing means and storage allocation information of said storage allocation means.

3. A data processing apparatus as set forth in claim 1, further comprising:

storage operation means for performing internal arrangement procedures relating to one of back-up, recovery and internal arrangement of each of said storage unit groups according to said storage reservation rules in response to external operation requirements.

4. A data processing apparatus as set forth in claim 2, further comprising:

storage operation means for performing internal arrangement procedures relating to one of back-up, recovery and internal arrangement of each of said storage unit groups according to said storage reservation rules in response to external operation requirements.

5. A data processing apparatus as set forth in claim 1, wherein said storage reservation rule storing means further stores space management attribute information of each of said storage unit groups, and said apparatus further comprises storage-space management means for periodically performing space arrangement in each of said storage unit groups according to said storage reservation rules and said space management attribute information of each of said storage unit groups.

6. A data processing apparatus as set forth in claim 2, wherein said storage reservation rule storing means further stores space management attribute information of each of said storage unit groups, and said apparatus further comprises storage space management means for periodically performing space arrangement in each of said storage unit groups according to said storage reservation rules and said space management attribute information of each of said storage unit groups.

7. A data processing apparatus as set forth in claim 3, wherein said storage reservation rule storing means further stores space management attribute information of each of said storage unit groups, and said apparatus further comprises storage space management means for periodically performing space arrangement in each of said storage unit groups according to said storage reservation rules and said space management attribute information of each of said storage unit groups.

8. A data processing apparatus as set forth in claim 4, wherein said storage reservation rule storing means further stores space management attribute information of each of said storage unit groups, and said apparatus further comprises storage space management means for periodically performing space arrangement in each of said storage unit groups according to said storage reservation rules and said space management attribute information of each of said storage unit groups.

9. A storage management method for managing an external storage device including a plurality of storage units, said plurality of storage units being previously classified into a plurality of storage unit groups, and said plurality of storage unit groups being previously reserved for a plurality of job groups corresponding to a plurality of normal operations, respectively, comprising:

a step for forming storage reservation rules expressed in machine language by compiling a storage reservation rule source program including storage reservation rules expressing a relationship between partial character strings of job names respectively corresponding to said plurality of job groups and said plurality of storage unit groups;

a step for selecting one of said plurality of storage unit groups corresponding to one of said partial character strings of job names which is input with a storage request of a file of one of said corresponding job groups based on a corresponding one of said storage reservation rules; and a step for allocating at least one of said plurality of storage units included in said selected one storage group to said one job group.

* * * * *